United States Patent
Waltermann

(10) Patent No.: US 6,813,632 B2
(45) Date of Patent: Nov. 2, 2004

(54) DISTRIBUTED FILE SYSTEM USING SCATTER-GATHER

(75) Inventor: Rod David Waltermann, Rougemont, NC (US)

(73) Assignee: International Business Machines Corporation, Armonk, NY (US)

(*) Notice: Subject to any disclaimer, the term of this patent is extended or adjusted under 35 U.S.C. 154(b) by 380 days.

(21) Appl. No.: 10/063,453

(22) Filed: Apr. 24, 2002

(65) Prior Publication Data

US 2003/0204571 A1 Oct. 30, 2003

(51) Int. Cl.⁷ .............................................. G06F 15/167
(52) U.S. Cl. ................. 709/214; 709/213; 709/216; 709/217; 709/218
(58) Field of Search ................................ 709/213, 214, 709/216, 217, 218; 711/147, 148

(56) References Cited

U.S. PATENT DOCUMENTS

| | | | |
|---|---|---|---|
| 5,421,007 A | | 5/1995 | Coleman et al. |
| 5,548,751 A | | 8/1996 | Ryu et al. |
| 5,561,793 A | | 10/1996 | Bennett et al. |
| 5,813,017 A | * | 9/1998 | Morris ....................... 707/204 |
| 5,890,169 A | | 3/1999 | Wong et al. |
| 6,041,334 A | | 3/2000 | Cannon |
| 6,075,251 A | * | 6/2000 | Chow et al. ................ 250/551 |
| 6,205,446 B1 | | 3/2001 | Mittal et al. |
| 6,324,581 B1 | * | 11/2001 | Xu et al. .................... 709/229 |
| 6,449,688 B1 | * | 9/2002 | Peters et al. ................ 711/112 |
| 6,453,354 B1 | * | 9/2002 | Jiang et al. ................. 709/229 |

* cited by examiner

Primary Examiner—T Nguyen
(74) Attorney, Agent, or Firm—Daniel E. McConnell

(57) ABSTRACT

Storage capability otherwise going underutilized in a LAN is made available for sharing among workstations connected to the LAN. Systems connected to a LAN are surveyed for storage capability potentially available for sharing, a weighting function is derived for each system which is indicative of shared system storage capability, and data files to be stored are scattered among and gathered from the connected systems.

9 Claims, 3 Drawing Sheets

DISTRIBUTED FILE SYSTEM USING SCATTER-GATHER

BACKGROUND OF INVENTION

It has become conventional to organize personal computer workstations into Local Area Networks or LANs. File sharing from system to system within a LAN is conventionally done in one of two ways. Either there is peer-to-peer sharing established by operating system settings on workstations which are to enable such sharing or there is a file server connected to the LAN which provides storage capability accessible to all, or an identified number, of the systems connected to the LAN.

Notwithstanding this conventional practice, it is also conventional for individual systems connected to a LAN to have storage capability which may be underutilized by the workstation operator. Particularly as the data storing capacity of hard drives has risen dramatically in recent times, the storage requirements of an operating system and most application programs and stored data in a personal computer workstation are significantly less than the capability provided. Thus, within a LAN, there will likely be significant storage capability which is available for other use should the systems and network accommodate such use.

SUMMARY OF INVENTION

The present invention contemplates that storage capability otherwise going underutilized in a LAN be made available for sharing among workstations connected to the LAN. In realizing this purpose of the present invention, systems connected to a LAN are surveyed for storage capability potentially available for sharing, a weighting function is derived for each system which is indicative of shared system storage capability, and data files to be stored are scattered among and gathered from the connected systems.

BRIEF DESCRIPTION OF DRAWINGS

Some of the purposes of the invention having been stated, others will appear as the description proceeds, when taken in connection with the accompanying drawings, in which.

DETAILED DESCRIPTION

Figure 1:
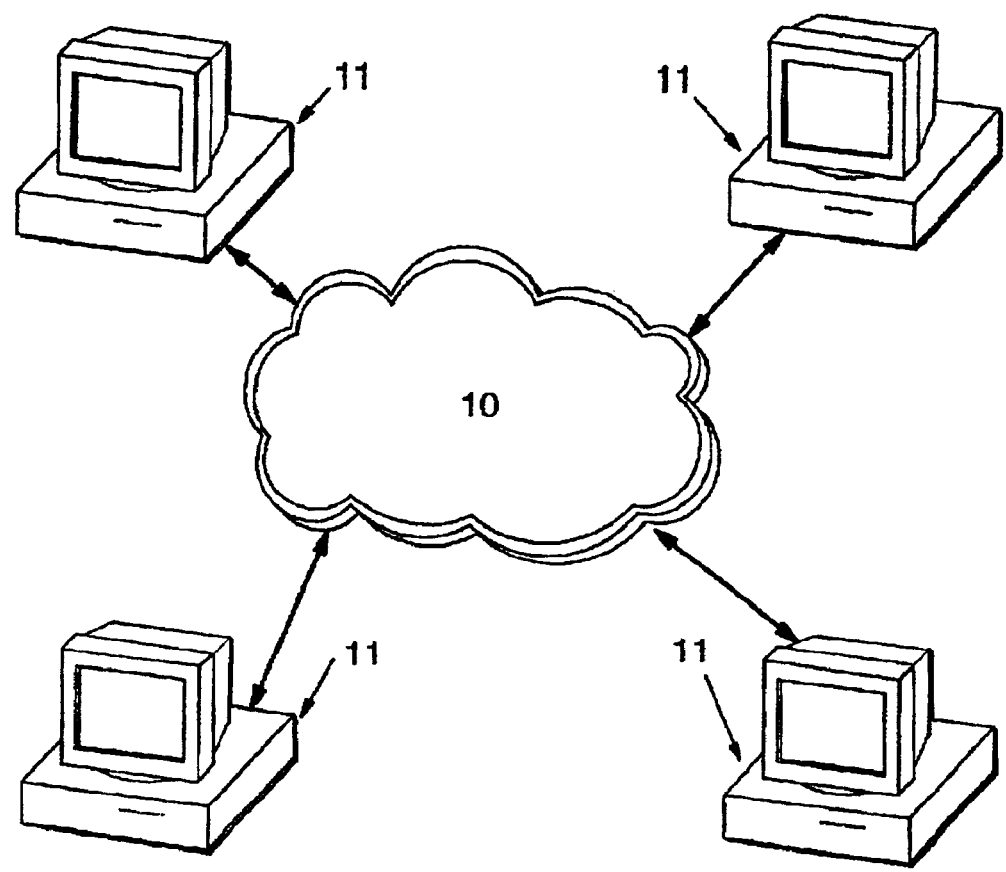
FIG. 1 is a representation of a LAN having a number of computer systems connected thereto.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Briefly stated, the present invention contemplates a method of sharing the storage capabilities of a plurality of computer system workstations connected together into a LAN which includes a step of surveying a plurality of computer systems associated one to another through a local area network and determining the free file storage capability of each surveyed system. For each surveyed system, a weighting function is determined based on available storage capacity, network connectivity, and system resources of the respective system. The weighting function, which may here be represented as $w(x)$ with x representing the particular system to which the function is assigned, is indicative of the capability of a given system to cooperate in scatter/gather file sharing as here proposed. Some systems within a LAN may have significant capabilities, while others may have limited or lesser capabilities. The present invention contemplates that such differences will be taken into account in file storage processes.

The systems of the present invention will respond to instruction at one of the plurality of systems to store a data file by dividing the data file to be stored into a plurality of portions to be scattered among the plurality of systems for storage, each portion being sized to accommodate the weighting function of a corresponding one of the plurality of systems. That is, the portions may be of unequal size, depending upon the capabilities of the systems to which they are to be assigned for storage. Each portion is tagged with encoded data identifying its sequence in the data file and the system to which its is assigned for storage. Additionally, and in order to preserve privacy and protection against contamination, each portion or token is digitally signed and encrypted by known techniques. Preferably, each token also includes error correcting code, such as a form of Reed-Solomon errors-and-erasures decoder, for the previous token and its identifying information and the next token and its identifying information to aid in reconstructing tokens which may become lost in the scatter/gather operation.

As the portions are created and tagged, an index table is created at the one system from which the file is to be stored which identifies each tagged portion and the system to which that tagged portion is assigned for storage. The table is then transmitted to each of the systems at which a tagged portion is stored for retention and use in retrieval of the data file.

When a data file so stored is to be retrieved, an instruction at one of said plurality of computer systems to retrieve from storage a data file stored in scattered portions in a plurality of the computer systems causes responses of accessing a table stored accessibly to the one computer system which identifies a plurality of tagged portions and the identity of the computer system to which the respective tagged portion is assigned for storage. As noted above, each of the portions or tokens has been sized to accommodate a weighting function of a corresponding one of the plurality of systems. The scattered portions are then gathered from the plurality of computer systems to the one computer system, decrypted as necessary, and assembled into the data file.

Referring now more particularly to FIG. 1, a LAN is there represented at 10 and has a plurality of computer system workstations 11 connected together there through. Each workstation has data storage capability provided by, for example, a rotating magnetic media hard disc drive (not specifically shown due to being conventionally well known). Storage capability may be provided by other types of devices, including re-writable optical disks, flash memory media, and the like. The capacity for storage data, accessibility over the LAN 10, and available rates of data transfer will be taken into account in determining a weighting function for each system. That weighting function will be used in determining the size of any portion or token to be assigned to that system for storage, should one of the systems on the LAN implement scattered file storage.

Figure 2:
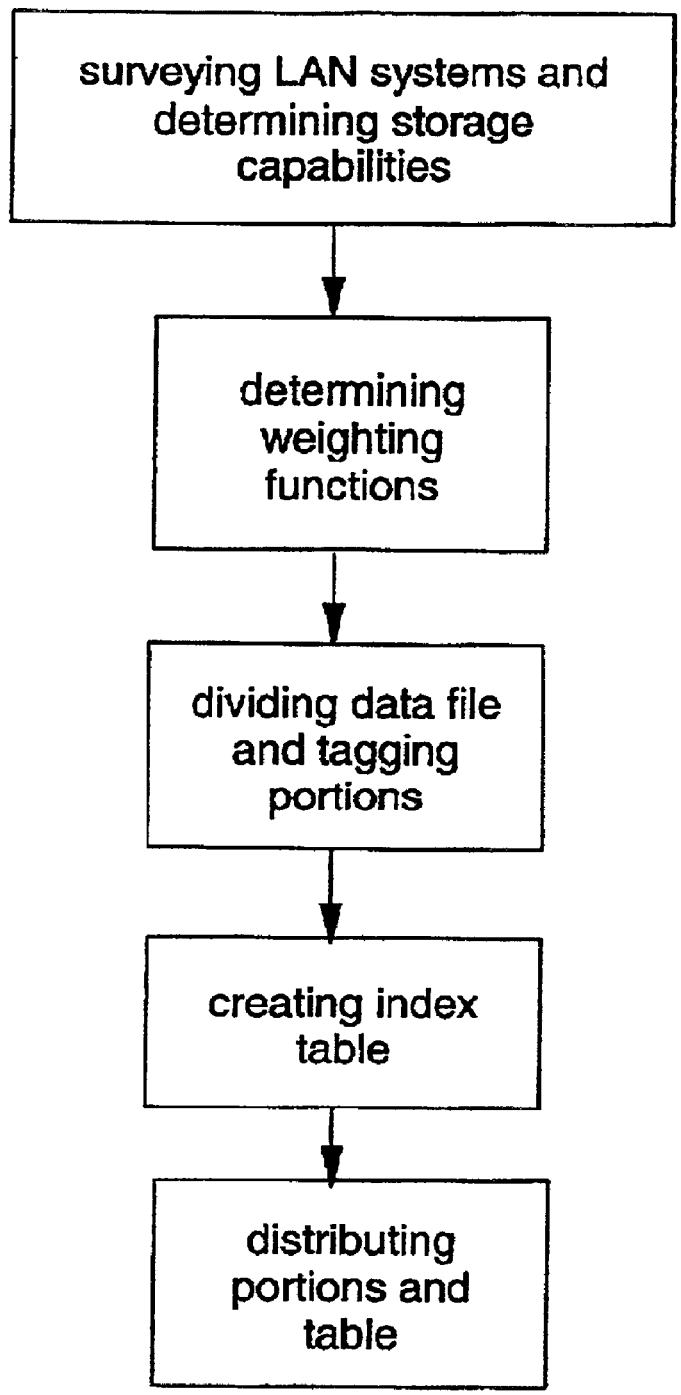
FIG. 2 is a schematic representation of a scattering file storage process.

Referring now to FIG. 2, the sequence of steps which occur when a user of one workstation calls for scattered file storage are represented. A data file to be stored is divided or broken into a plurality of portions or tokens, sized for recoverability and for the weighting functions of systems having available storage capability. Each token is digitally signed for its origin and encrypted, a process here referred to as tagging. Each token is hashed with a unique machine identification and a marker denoting where in the sequence of portions it belongs. Error correcting code preferably is included, relating a token to the next previous token in the sequence and the next subsequent token in the sequence, to aid in reconstructing tokens if necessary. Should there be a number of tokens which exceed the available systems to receive them in a scatter operation, then no two contiguous tokens are stored on the same system. If deemed appropriate or necessary, tokens may be stored on multiple systems, in order to provide redundancy for safety.

An index table is constructed on the originating system composed of all the hash codes, error correcting codes, and systems identifications for the systems to which the data file has been scattered. Once completed, the table may be compressed, digitally signed for identification, encrypted, and then distributed to each system which has received one of the portions.

Figure 3:
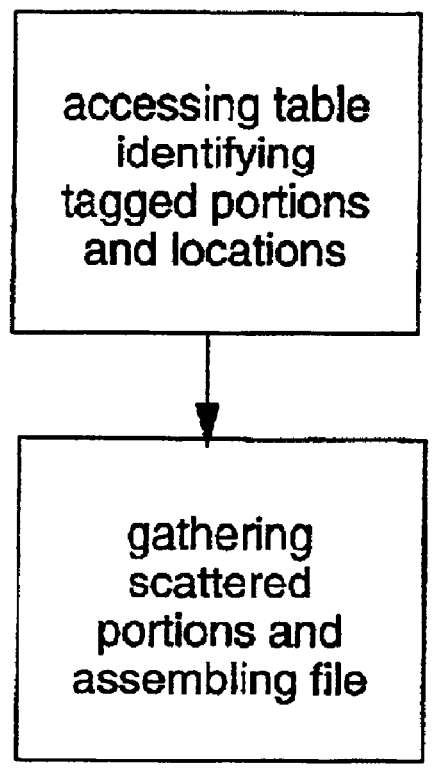
FIG. 3 is a schematic representation of a gathering file retrieval process.

Referring now to FIG. 3, the sequence of steps which occur when a user of one of the systems calls for recovery of a stored file are represented. On instructions to retrieve a file, the index table is opened and qualified by checking the signature and, if correct, decrypting as necessary. The table is then referenced to determine the locations and sequence of the stored tokens. The tokens can then be gathered, decrypted as necessary, and the file restored. If any tokens are missing, the error correction data stored in the next preceding and following tokens are used. If a number of contiguous tokens are missing, then the error correcting information stored in the table and the next preceding and following tokens are used. Reconstruction can be recursively repeated until restoration is complete or it is determined that the data file has become so corrupted as to be unusable.

In the event that a signature is deemed incorrect, then a search through the connected systems is undertaken to discover a correctly signified copy of the table. The reconstruction then proceeds using that identified table, and as described above.

Figure 4:
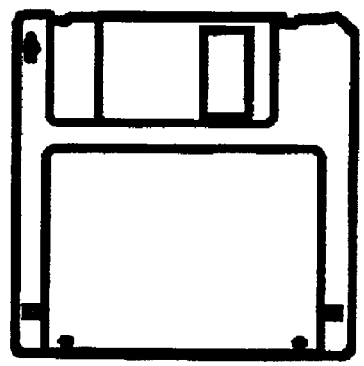
FIG. 4 is a representation of a computer readable medium on which program instructions are stored accessibly to a computer system.

Referring now to FIG. 4, a diskette is there shown as being one form of computer readable media on which may be stored, accessibly to a computer system 11, instructions for performance of the processes described above and with reference to FIGS. 2 and 3.

In the drawings and specifications there has been set forth a preferred embodiment of the invention and, although specific terms are used, the description thus given uses terminology in a generic and descriptive sense only and not for purposes of limitation.

What is claimed is:

1. A method comprising the steps of:
   surveying a plurality of computer systems associated one to another through a local area network and determining the free file storage capability of each surveyed system;
   determining for each surveyed system a weighting function based on available storage capacity, network connectivity, and system resources of the respective system;
   responding to instruction at one of said plurality of systems to store a data file by:
   dividing the data file to be stored into a plurality of portions to be scattered among the plurality of systems for storage, each portion being sized to accommodate the weighting function of a corresponding one of the plurality of systems;
   tagging each portion with encoded data identifying its sequence in the data file and system assigned for storage;
   creating at said one system at which an instruction for storing the data file is given an index table identifying each tagged portion and the system to which that tagged portion is assigned for storage; and
   transmitting the portions and the table to each of the systems at which a tagged portion is stored for retention and use in retrieval of the data file.

2. Apparatus comprising:
   a plurality of computer systems associated one to another through a local area network, each of said systems having a processing unit and data storage capability; and
   a program module stored accessibly to said processing unit of each of said plurality of computer systems;
   said program module cooperating with each of said processing units when executing thereon to scatter a data file to be stored from one of said plurality of computer systems across the storage capabilities of a plurality of said computer systems, said program module and the processing unit of said one of said plurality of computer systems responding to instruction at said one of said plurality of systems to store a data file by:
   dividing the data file to be stored into a plurality of portions to be scattered among the plurality of systems for storage, each portion being sized to accommodate the weighting function of a corresponding one of the plurality of systems;
   tagging each portion with encoded data identifying its sequence in the data file and system assigned for storage;
   creating at said one system at which an instruction for storing the data file is given an index table identifying each tagged portion and the system to which that tagged portion is assigned for storage; and
   transmitting the portions and the table to each of the systems at which a tagged portion is stored for retention and use in retrieval of the data file.

3. Apparatus comprising:
   a computer readable medium; and
   a program module stored on said medium accessibly to a computer system;
   said program module, when executing on a computer system which is one of a plurality of computer systems associated one to another through a local area network, surveying the plurality of computer systems and determining the free file storage capability of each surveyed system;
   determining for each surveyed system a weighting function based on available storage capacity, network connectivity, and system resources of the respective system; and
   responding to instruction at one of said plurality of systems to store a data file by:
   dividing the data file to be stored into a plurality of portions to be scattered among the plurality of systems for storage, each portion being sized to accommodate the weighting function of a corresponding one of the plurality of systems;

tagging each portion with encoded data identifying its sequence in the data file and system assigned for storage;

creating at said one system at which an instruction for storing the data file is given an index table identifying each tagged portion and the system to which that tagged portion is assigned for storage; and transmitting the portions and the table to each of the systems at which a tagged portion is stored for retention and use in retrieval of the data file.

4. A method comprising the steps of:

responding to instruction at one of a plurality of computer systems associated one to another through a local area network to retrieve from storage a data file stored in scattered portions in a plurality of the computer systems by:

accessing a table stored accessibly to the one computer system which identifies a plurality of tagged portions and the identity of the computer system to which the respective tagged portion is assigned for storage, each of the portions having been sized to accommodate a weighting function of a corresponding one of the plurality of systems; and gathering scattered portions from the plurality of computer systems to the one computer system and assembling the retrieved portions into the data file.

5. Apparatus comprising:

a plurality of computer systems associated one to another through a local area network, each of said systems having a processing unit and data storage capability; and a program module stored accessibly to said processing unit of each of said plurality of computer systems;

said program module cooperating with each of said processing units when executing thereon to retrieve a data file which has been stored in scattered form across the storage capabilities of a plurality of said computer systems, said program module and the processing unit of said one of said plurality of computer systems responding to instruction at said one of said plurality of systems to retrieve a data file by:

accessing a table stored accessibly to the one computer system which identifies a plurality of tagged portions and the identity of the computer system to which the respective tagged portion is assigned for storage, each of the portions having been sized to accommodate a weighting function of a corresponding one of the plurality of systems; and gathering scattered portions from the plurality of computer systems to the one computer system and assembling the retrieved portions into the data file.

6. Apparatus comprising:

a computer readable medium; and a program module stored on said medium accessibly to a computer system;

said program module, when executing on a computer system which is one of a plurality of computer systems associated one to another through a local area network, responding to instruction at one of said plurality of computer systems to retrieve from storage a data file stored in scattered portions in a plurality of the computer systems by:

accessing a table stored accessibly to the one computer system which identifies a plurality of tagged portions and the identity of the computer system to which the respective tagged portion is assigned for storage, each of the portions having been sized to accommodate a weighting function of a corresponding one of the plurality of systems; and gathering scattered portions from the plurality of computer systems to the one computer system and assembling the retrieved portions into the data file.

7. A method comprising the steps of:

surveying a plurality of computer systems associated one to another through a local area network and determining the free file storage capability of each surveyed system;

determining for each surveyed system a weighting function based on available storage capacity, network connectivity, and system resources of the respective system;

responding to instruction at one of said plurality of systems to store a data file by:

dividing the data file to be stored into a plurality of portions to be scattered among the plurality of systems for storage, each portion being sized to accommodate the weighting function of a corresponding one of the plurality of systems;

tagging each portion with encoded data identifying its sequence in the data file and system assigned for storage;

creating at said one system at which an instruction for storing the data file is given an index table identifying each tagged portion and the system to which that tagged portion is assigned for storage; and transmitting the portions and the table to each of the systems at which a tagged portion is stored for retention and use in retrieval of the data file; and responding to instruction at one of said plurality of computer systems to retrieve from storage a data file stored in scattered portions in a plurality of the computer systems by:

accessing a table stored accessibly to the one computer system which identifies a plurality of tagged portions and the identity of the computer system to which the respective tagged portion is assigned for storage, each of the portions having been sized to accommodate a weighting function of a corresponding one of the plurality of systems; and gathering scattered portions from the plurality of computer systems to the one computer system and assembling the retrieved portions into the data file.

8. Apparatus comprising:

a plurality of computer systems associated one to another through a local area network, each of said systems having a processing unit and data storage capability; and a program module stored accessibly to said processing unit of each of said plurality of computer systems;

said program module cooperating with each of said processing units when executing thereon to scatter a data file to be stored from one of said plurality of computer systems across the storage capabilities of a plurality of said computer systems, said program module and the processing unit of said one of said plurality of computer systems responding to instruction at said one of said plurality of systems to store a data file by:

dividing the data file to be stored into a plurality of portions to be scattered among the plurality of systems for storage, each portion being sized to accommodate the weighting function of a corresponding one of the plurality of systems;

tagging each portion with encoded data identifying its sequence in the data file and system assigned for storage;

creating at said one system at which an instruction for storing the data file is given an index table identifying each tagged portion and the system to which that tagged portion is assigned for storage; and transmitting the portions and the table to each of the systems at which a tagged portion is stored for retention and use in retrieval of the data file; and said program module and the processing unit of one of said plurality of computer systems responding to instruction at said one of said plurality of systems to retrieve a data file by:

accessing a table stored accessibly to the one computer system which identifies a plurality of tagged portions and the identity of the computer system to which the respective tagged portion is assigned for storage, each of the portions having been sized to accommodate a weighting function of a corresponding one of the plurality of systems; and gathering scattered portions from the plurality of computer systems to the one computer system and assembling the retrieved portions into the data file.

9. Apparatus comprising:

a computer readable medium; and a program module stored on said medium accessibly to a computer system;

said program module, when executing on a computer system which is one of a plurality of computer systems associated one to another through a local area network, surveying the plurality of computer systems and determining the free file storage capability of each surveyed system;

determining for each surveyed system a weighting function based on available storage capacity, network connectivity, and system resources of the respective system; and responding to instruction at one of said plurality of systems to store a data file by:

dividing the data file to be stored into a plurality of portions to be scattered among the plurality of systems for storage, each portion being sized to accommodate the weighting function of a corresponding one of the plurality of systems;

tagging each portion with encoded data identifying its sequence in the data file and system assigned for storage;

creating at said one system at which an instruction for storing the data file is given an index table identifying each tagged portion and the system to which that tagged portion is assigned for storage; and transmitting the portions and the table to each of the systems at which a tagged portion is stored for retention and use in retrieval of the data file; and said program module, when executing on a computer system which is one of the plurality of computer systems, responding to instruction at one of said plurality of computer systems to retrieve from storage a data file stored in scattered portions in a plurality of the computer systems by:

accessing a table stored accessibly to the one computer system which identifies a plurality of tagged portions and the identity of the computer system to which the respective tagged portion is assigned for storage, each of the portions having been sized to accommodate a weighting function of a corresponding one of the plurality of systems; and gathering scattered portions from the plurality of computer systems to the one computer system and assembling the retrieved portions into the data file.

* * * * *